(12) United States Patent
Zeng

(10) Patent No.: US 11,849,157 B2
(45) Date of Patent: Dec. 19, 2023

(54) SYSTEMS AND METHODS FOR LIVE STREAMING

(71) Applicant: ZHEJIANG DAHUA TECHNOLOGY CO., LTD., Zhejiang (CN)

(72) Inventor: Shengfeng Zeng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 148 days.

(21) Appl. No.: 17/647,985

(22) Filed: Jan. 14, 2022

(65) Prior Publication Data

US 2022/0141501 A1 May 5, 2022

Related U.S. Application Data

(63) Continuation of application No. PCT/CN2019/121512, filed on Nov. 28, 2019.

(30) Foreign Application Priority Data

Jul. 16, 2019 (CN) .......................... 201910642383.5

(51) Int. Cl.
*H04N 21/2187* (2011.01)
*H04N 21/2183* (2011.01)
(Continued)

(52) U.S. Cl.
CPC ..... *H04N 21/2187* (2013.01); *H04N 21/2183* (2013.01); *H04N 21/233* (2013.01);
(Continued)

(58) Field of Classification Search
None
See application file for complete search history.

(56) References Cited

U.S. PATENT DOCUMENTS 8,769,614 B1 * 7/2014 Knox .................... H04L 65/612
726/3
9,532,092 B1 * 12/2016 Suryanarayanan ..........................
H04N 21/2358
(Continued)

FOREIGN PATENT DOCUMENTS

CN 105208463 A 12/2015
CN 105847941 A 8/2016
(Continued)

OTHER PUBLICATIONS

International Search Report in PCT/CN2019/121512 dated Apr. 8, 2020, 4 pages.
(Continued)

*Primary Examiner* — Quang N Nguyen
(74) *Attorney, Agent, or Firm* — METIS IP LLC

(57) ABSTRACT

The present disclosure relates to systems and methods for live streaming. The system may receive a play request associated with a live stream from a terminal device. The system may determine whether there are one or more cached fragments associated with the live stream, wherein the one or more cached fragments are cached from a stream source via a first protocol. In response to determining that there are one or more cached fragments associated with the live stream, the system may determine whether the play request is a request that the terminal device requests the live stream for the first time. In response to determining that the play request is the request that the terminal device requests the live stream for the first time, after a caching of a current fragment is completed, the system may transmit an index file corresponding to the current fragment and at least one of the one or more cached fragments to the terminal device via a second protocol.

15 Claims, 9 Drawing Sheets

(51) Int. Cl.
  *H04N 21/233* (2011.01)
  *H04N 21/262* (2011.01)
  *H04N 21/6437* (2011.01)
  *H04N 21/658* (2011.01)

(52) U.S. Cl.
  CPC ... *H04N 21/26258* (2013.01); *H04N 21/6437* (2013.01); *H04N 21/6581* (2013.01)

(56) References Cited

U.S. PATENT DOCUMENTS

| | | | | |
|---|---|---|---|---|
| 2011/0296048 | A1* | 12/2011 | Knox | H04L 65/765 |
| | | | | 709/231 |
| 2012/0265853 | A1* | 10/2012 | Knox | H04L 65/70 |
| | | | | 709/218 |
| 2013/0117418 | A1* | 5/2013 | Mutton | H04N 21/8456 |
| | | | | 709/219 |
| 2014/0189146 | A1 | 7/2014 | Keum et al. | |
| 2017/0054800 | A1 | 2/2017 | Divincenzo et al. | |

FOREIGN PATENT DOCUMENTS

| | | |
|---|---|---|
| CN | 106790005 A | 5/2017 |
| CN | 107396205 A | 11/2017 |
| CN | 108235064 A | 6/2018 |
| CN | 108540868 A | 9/2018 |
| CN | 108632642 A | 10/2018 |
| CN | 108632680 A | 10/2018 |
| CN | 109151614 A | 1/2019 |
| KR | 20190062815 A | 6/2019 |
| WO | 2013163448 A1 | 10/2013 |

OTHER PUBLICATIONS

Written Opinion in PCT/CN2019/121512 dated Apr. 8, 2020, 5 pages.
First Office Action in Chinese Application No. 201910642383.5 dated Feb. 6, 2020, 19 pages.

* cited by examiner

SYSTEMS AND METHODS FOR LIVE STREAMING

CROSS-REFERENCE TO RELATED APPLICATIONS

This application is a Continuation of International Application No. PCT/CN2019/121512, filed on Nov. 28, 2019, which claims priority to Chinese Patent Application No. 201910642383.5 filed on Jul. 16, 2019, the contents of each of which are incorporated herein by reference in their entirety.

TECHNICAL FIELD

The present disclosure generally relates to streaming media technology, and in particular, to systems and methods for live streaming.

BACKGROUND

With the development of network technology and video/audio technology, the exploration of streaming media technology (e.g., live streaming technology) has developed rapidly nowadays. For a live streaming system based on a HTTP Live Streaming (HLS), when a terminal requests a live stream (which has been requested by another terminal, that is, there are one or more cached video fragments associated with the live stream) for the first time, the live streaming system transmits an index file corresponding to the cached video fragments to the terminal, which may result in a relatively high live delay and further reduce user experience. Therefore, it is desirable to provide improved systems and methods for live streaming with relatively low live delay.

SUMMARY

An aspect of the present disclosure relates to a method for responding to a play request. The method may include receiving, by a server, a play request from a terminal device; determining, by the server, whether the play request is a first play request sent by the terminal device to the server; in response to determining, by the server, that the play request is the first play request sent by the terminal device to the server, after a caching of a current video fragment from a source station is completed, generating, by the server a first index file; and transmitting, by the server, the first index file to the terminal device.

In some embodiments, the method may further include generating a second index file based on one or more cached video fragments cached from the source station in response to determining, by the server, that the play request is not the first play request sent by the terminal device to the server and transmitting the second index file to the terminal device.

In some embodiments, the method may further include assigning a Universally Unique Identifier (UUID) to the terminal device by the server when receiving a play request from the terminal device and the determining, by the server whether the play request is the first play request sent by the terminal device to the server may include determining whether the play request is the first play request sent by the terminal device to the server based on the UUID.

In some embodiments, the assigning the UUID to the terminal device by the server when receiving the play request from the terminal device may include when receiving the play request from the terminal device, transmitting, by the server, the UUID and a redirect address to the terminal device to allow the terminal device to continue to send the play request to the server based on the redirect address.

In some embodiments, the method may further include when receiving the play request from the terminal device, recording, by the server, the play request and an order and a count of play requests received from the terminal device; associatively saving, by the server, the order and the count of the play requests received from the terminal device and the UUID of the terminal device to establish a correspondence table between the UUID of the terminal device and the count; and the determining, by the server, whether the play request is the first play request sent by the terminal device to the server based on the UUID may include searching for, by the server, a count corresponding to the UUID in the correspondence table based on the UUID and determining, by the server, whether the play request is the first play request sent by the terminal device to the server based on the count corresponding to the UUID.

In some embodiments, the server may be an HTTP Live Streaming (HLS) server, the play request may be an M3U8 request, and the index file may be an M3U8 index file.

In some embodiments, the generating the first index file and transmitting the first index file to the terminal device may include generating the first index file and transmitting the first index file to the terminal device to allow the terminal device to request a corresponding video fragment from the server based on a sequence indicated by the first index file.

In some embodiments, the generating the second index file and transmitting the second index file to the terminal device may include generating the second index file and transmitting the second index file to the terminal device to allow the terminal device to request a corresponding video fragment from the server based on a sequence indicated by the second index file.

In some embodiments, the determining, by the server, whether the play request is the first play request sent by the terminal device to the server may include determining, by the server, whether the play request is a request sent by a first user requesting the video in the source station; in response to determining that the play request is the request sent by the first user requesting the video in the source station, obtaining, by the server, real time data stream of the video from the source station; fragmenting the real time data stream of the video into a plurality of video fragments; and caching the plurality of video fragments into a cache.

A further aspect of the present disclosure relates to server including a processor and a storage electrically coupled to the processor. The storage may store a computer program and the processor may be configured to execute the computer program to implement the method for responding to a play request.

A still further aspect of the present disclosure relates to a computer readable storage medium storing a computer program. When the computer program is executed, the method for responding to a play request may be implemented.

A still further aspect of the present disclosure relates to a system for live streaming. The system may include at least one storage medium including a set of instructions and at least one processor in communication with the at least one storage medium. When executing the set of instructions, the at least one processor may be directed to cause the system to receive a play request associated with a live stream from a terminal device; determine whether there are one or more cached fragments associated with the live stream, wherein the one or more cached fragments are cached from a stream source via a first protocol; determine, in response to determining that there are one or more cached fragments associated with the live stream, whether the play request is a request that the terminal device requests the live stream for the first time; and transmit, in response to determining that the play request is the request that the terminal device requests the live stream for the first time, after a caching of a current fragment is completed, an index file corresponding to the current fragment and at least one of the one or more cached fragments to the terminal device via a second protocol.

In some embodiments, the at least one processor may be directed to cause the system further to access, in response to determining that there is no cached fragment associated with the live stream, the stream source via the first protocol to cache a predetermined number of fragments associated with the live stream and transmit an index file corresponding to the predetermined number of fragments to the terminal device via the second protocol.

In some embodiments, the at least one processor may be directed to cause the system further to transmit, in response to determining that the play request is not the request that the terminal device requests the live stream for the first time, an index file corresponding to at least one of the one or more cached fragments to the terminal device via the second protocol.

In some embodiments, to determine whether the play request is the request that the terminal device requests the live stream for the first time, the at least one processor may be directed to cause the system further to determine whether the play request is the request that the terminal device requests the live stream for the first time based on an identifier corresponding to the terminal device.

In some embodiments, the identifier corresponding to the terminal device may include a Universally Unique Identifier (UUID).

In some embodiments, the identifier corresponding to the terminal device may be assigned to the terminal device via a redirect.

In some embodiments, the first protocol may include a Real Time Streaming Protocol (RTSP) and/or a Real Time Messaging Protocol (RTMP) and the second protocol may include an HTTP Live Streaming (HLS).

In some embodiments, the at least one processor may be directed to cause the system to receive a fragment request associated with the current fragment and the at least one of the one or more cached fragments from the terminal device and transmit the current fragment and the at least one of the one or more cached fragments to the terminal device sequentially according to the index file.

In some embodiments, the play request may be an M3U8 request and the index file may be an M3U8 index file.

A still further aspect of the present disclosure relates to a method implemented on a computing device including at least one processor, at least one storage medium, and a communication platform connected to a network. The method may include receiving a play request associated with a live stream from a terminal device; determining whether there are one or more cached fragments associated with the live stream, wherein the one or more cached fragments are cached from a stream source via a first protocol; determining, in response to determining that there are one or more cached fragments associated with the live stream, whether the play request is a request that the terminal device requests the live stream for the first time; and transmitting, in response to determining that the play request is the request that the terminal device requests the live stream for the first time, after a caching of a current fragment is completed, an index file corresponding to the current fragment and at least one of the one or more cached fragments to the terminal device via a second protocol.

In some embodiments, the method may further include accessing, in response to determining that there is no cached fragment associated with the live stream, the stream source via the first protocol to cache a predetermined number of fragments associated with the live stream and transmitting an index file corresponding to the predetermined number of fragments to the terminal device via the second protocol.

In some embodiments, the method may further include transmitting, in response to determining that the play request is not the request that the terminal device requests the live stream for the first time, an index file corresponding to at least one of the one or more cached fragments to the terminal device via the second protocol.

In some embodiments, the determining whether the play request is the request that the terminal device requests the live stream for the first time may include determining whether the play request is the request that the terminal device requests the live stream for the first time based on an identifier corresponding to the terminal device.

In some embodiments, the identifier corresponding to the terminal device may include a Universally Unique Identifier (UUID).

In some embodiments, the identifier corresponding to the terminal device may be assigned to the terminal device via a redirect.

In some embodiments, the first protocol may include a Real Time Streaming Protocol (RTSP) and/or a Real Time Messaging Protocol (RTMP) and the second protocol may include an HTTP Live Streaming (HLS).

In some embodiments, the method may further include receiving a fragment request associated with the current fragment and the at least one of the one or more cached fragments from the terminal device and transmitting the current fragment and the at least one of the one or more cached fragments to the terminal device sequentially according to the index file.

In some embodiments, the play request may be an M3U8 request and the index file may be an M3U8 index file.

A still further aspect of the present disclosure relates to a system for live streaming. The system may include a receiving module, a first determination module, a second determination module, and a transmission module. The receiving module may be configured to receive, from a terminal device, a play request associated with a live stream. The first determination module may be configured to determine whether there are one or more cached fragments associated with the live stream, wherein the one or more cached fragments are cached from a stream source via a first protocol. The second determination module may be configured to determine, in response to determining that there are one or more cached fragments associated with the live stream, whether the play request is a request that the terminal device requests the live stream for the first time. The transmission module may be configured to transmit, in response to determining that the play request is the request that the terminal device requests the live stream for the first time, after a caching of a current fragment is completed, an index file corresponding to the current fragment and at least one of the one or more cached fragments to the terminal device via a second protocol.

In some embodiments, the second determination module may be further configured to access, in response to determining that there is no cached fragment associated with the live stream, the stream source via the first protocol to cache a predetermined number of fragments associated with the live stream. The transmission module may be further configured to transmit an index file corresponding to the predetermined number of fragments to the terminal device via the second protocol.

In some embodiments, the transmission module may be further configured to transmit, in response to determining that the play request is not the request that the terminal device requests the live stream for the first time, an index file corresponding to at least one of the one or more cached fragments to the terminal device via the second protocol.

In some embodiments, to determine whether the play request is the request that the terminal device requests the live stream for the first time, the second determination module may be further configured to determine whether the play request is the request that the terminal device requests the live stream for the first time based on an identifier corresponding to the terminal device.

In some embodiments, the identifier corresponding to the terminal device may include a Universally Unique Identifier (UUID).

In some embodiments, the identifier corresponding to the terminal device may be assigned to the terminal device via a redirect.

In some embodiments, the first protocol may include a Real Time Streaming Protocol (RTSP) and/or a Real Time Messaging Protocol (RTMP) and the second protocol may include an HTTP Live Streaming (HLS).

In some embodiments, the receiving module may be further configured to receive a fragment request associated with the current fragment and the at least one of the one or more cached fragments from the terminal device. The transmission module may be further configured to transmit the current fragment and the at least one of the one or more cached fragments to the terminal device sequentially according to the index file.

In some embodiments, the play request may be an M3U8 request and the index file may be an M3U8 index file.

A still further aspect of the present disclosure relates to a non-transitory computer readable medium including executable instructions. When the executable instructions are executed by at least one processor, the executable instructions may direct the at least one processor to perform a method. The method may include receiving a play request associated with a live stream from a terminal device; determining whether there are one or more cached fragments associated with the live stream, wherein the one or more cached fragments are cached from a stream source via a first protocol; determining, in response to determining that there are one or more cached fragments associated with the live stream, whether the play request is a request that the terminal device requests the live stream for the first time; and transmitting, in response to determining that the play request is the request that the terminal device requests the live stream for the first time, after a caching of a current fragment is completed, an index file corresponding to the current fragment and at least one of the one or more cached fragments to the terminal device via a second protocol.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
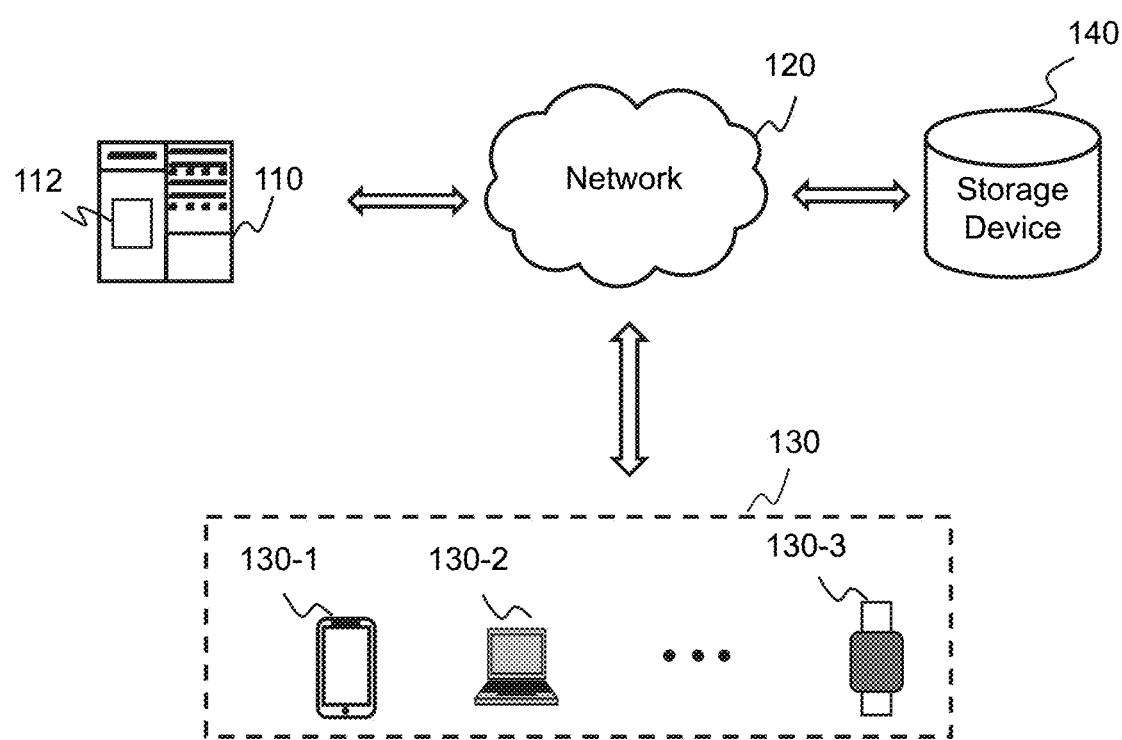
FIG. 1 is a schematic diagram illustrating an exemplary live streaming system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for live streaming. The system may receive a play request (e.g., an M3U8 request) associated with a live stream from a terminal device (e.g., a cellphone). Further, the system may determine whether there are one or more cached fragments (also referred to as "video fragments") associated with the live stream, wherein the one or more cached fragments are cached from a stream source via a first protocol (e.g., an RTSP, an RTMP). In response to determining that there are one or more cached fragments associated with the live stream, that is, the terminal device is a non-first terminal device to request the live stream, the system may determine whether the play request is a request that the terminal device requests the live stream for the first time. In response to determining that the play request is the request that the terminal device requests the live stream for the first time, after a caching of a current fragment is completed, the system may transmit an index file (e.g., an M3U8 index file) corresponding to the current fragment and at least one of the one or more cached fragments to the terminal device via a second protocol (e.g., an HLS). After receiving the index file from the system, the terminal device may send a fragment request associated with fragments (e.g., the current fragment and the at least one of the one or more cached fragments) corresponding to the index file to the system. After receiving the fragment request, the system may transmit the fragments to the terminal device sequentially according to the index file to be played sequentially by the terminal device.

According to the systems and methods of the present disclosure, when there are one or more cached fragments associated with a live stream in the system (i.e., the terminal device is a non-first terminal device to request the live stream), the system may send an index file to the terminal device after a caching of a current fragment is completed, which can reduce a live delay associated with the live stream for the terminal device and further improve user experience.

FIG. 1 is a schematic diagram illustrating an exemplary live streaming system according to some embodiments of the present disclosure. As shown, the live streaming system 100 may include a server 110, a network 120, a user device (also referred to as a "terminal device") 130, and a storage device 140.

The server 110 may be a single server or a server group. The server group may be centralized or distributed (e.g., the server 110 may be a distributed system). In some embodiments, the server 110 may be local or remote. For example, the server 110 may access information and/or data stored in the user device 130 and/or the storage device 140 via the network 120. As another example, the server 110 may be directly connected to the user device 130 and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to the live streaming to perform one or more functions described in the present disclosure. For example, the processing device 112 may receive a play request associated with a live stream from a terminal device and determine whether there are one or more cached fragments associated with the live stream cached from a stream source. In response to determining that there are one or more cached fragments, the processing device 112 may further determine whether the play request is a request that the terminal device requests the live stream for the first time. In response to determining that the play request is the request that the terminal device requests the live stream for the first time, after a caching of a current fragment is completed, the processing device 112 may transmit an index file corresponding to the current fragment and at least one of the one or more cached fragments to the terminal device. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the user device 130) of the live streaming system 100. For example, the processing device 112 may be integrated into the user device 140 and the functions (e.g., responding to the play request associated with the live stream) of the processing device 112 may be implemented by the user device 130.

The network 120 may facilitate exchange of information and/or data for the live streaming system 100. In some embodiments, one or more components (e.g., the server 110, the user device 130, the storage device 140) of the live streaming system 100 may transmit information and/or data to other component(s) of the live streaming system 100 via the network 120. For example, the server 110 may receive the play request associated with the live stream from the terminal device via the network 120. As another example, the server 110 may obtain the one or more cached fragments associated with the live stream from the storage device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The user device 130 may be configured to receive information and/or data from the server 110 and/or the storage device 140 via the network 120. For example, the user device 130 may receive the index file in response to a play request from the server 110. In some embodiments, the user device 130 may provide a user interface via which a user may view information and/or input data and/or instructions to the live streaming system 100. For example, the user may view video fragments obtained from the server 110 via the user interface. As another example, the user may input an instruction associated with a live streaming parameter via the user interface. In some embodiments, the user device 130 may include a mobile phone 130-1, a computer 130-2, a wearable device 130-3, or the like, or any combination thereof. In some embodiments, the user device 130 may include a display that can display information in a human-readable form, such as text, image, audio, video, graph, animation, or the like, or any combination thereof. The display of the user device 130 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 130 may be connected to one or more components (e.g., the storage device 140) of the live streaming system 100 via the network 120.

The storage device 140 may be configured to store data and/or instructions. The data and/or instructions may be obtained from, for example, the server 110 and/or any other component of the live streaming system 100. In some embodiments, the storage device 140 may store data and/or instructions that the server 110 may execute or use to perform exemplary methods described in the present disclosure. For example, the storage device 140 may store the one or more cached fragments cached from the stream source. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components (e.g., the server 110, the user device 130) of the live streaming system 100. One or more components of the live streaming system 100 may access the data or instructions stored in the storage device 140 via the network 120. In some embodiments, the storage device 140 may be directly connected to or communicate with one or more components (e.g., the server 110, the user device 130) of the live streaming system 100. In some embodiments, the storage device 140 may be part of other components of the live streaming system 100, such as the server 110 or the user device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
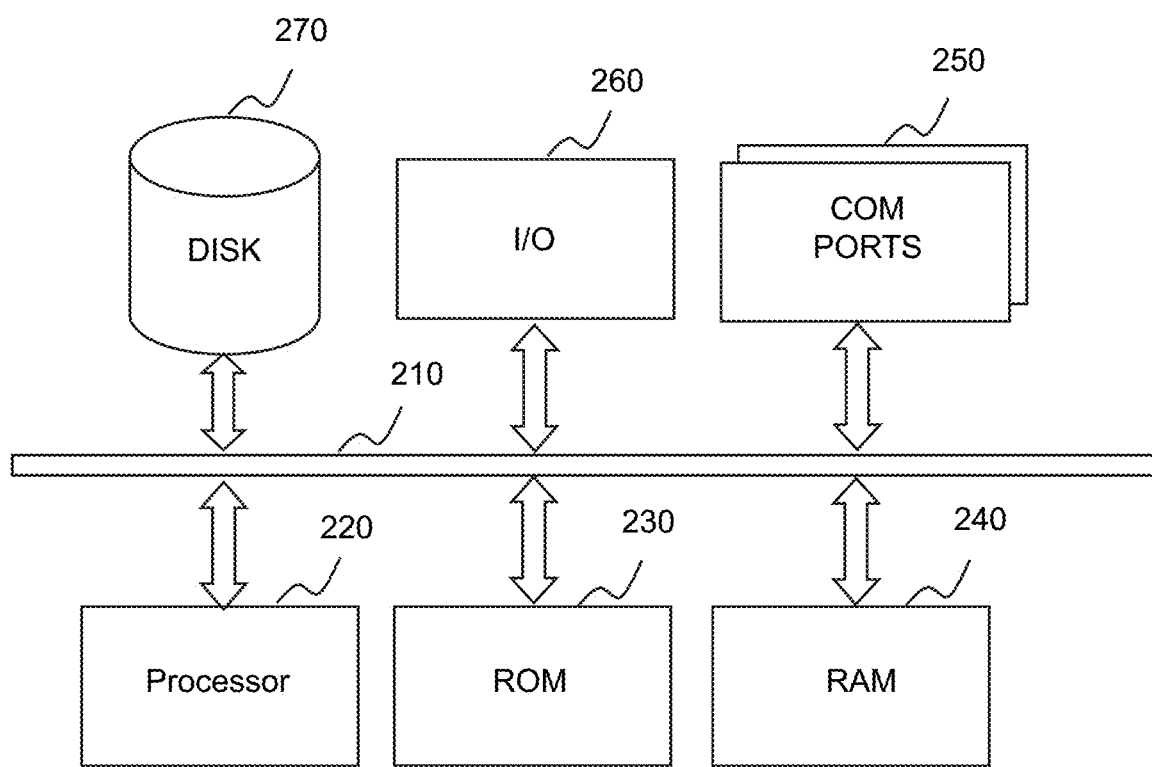
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the live streaming system 100 as described herein. For example, the processing device 112 may be implemented on the computing device 200, via its hardware, software program, firmware, or a combination thereof. Although only one such computer is shown, for convenience, the computer functions relating to live streaming as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
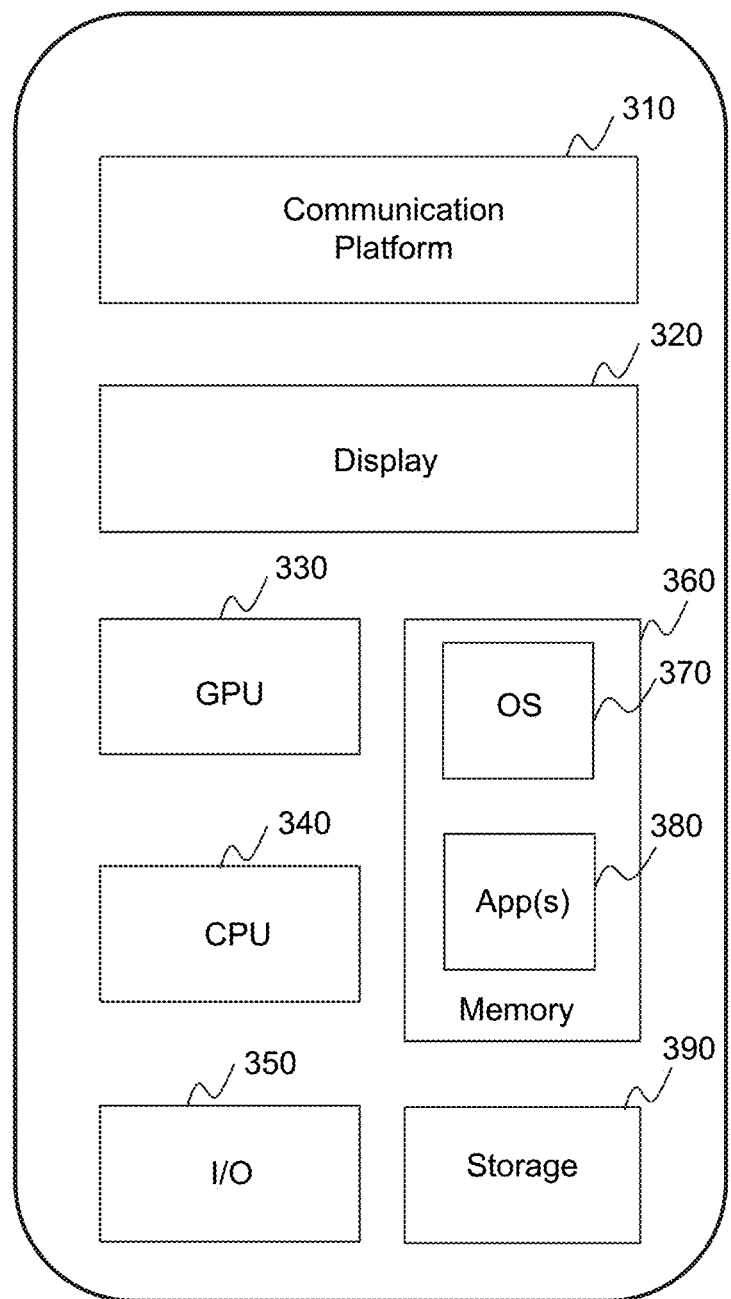
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the user device 130 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to live streaming or other information from the processing device 112. User interactions may be achieved via the I/O 350 and provided to the processing device 112 and/or other components of the live streaming system 100 via the network 120.

Figure 4:
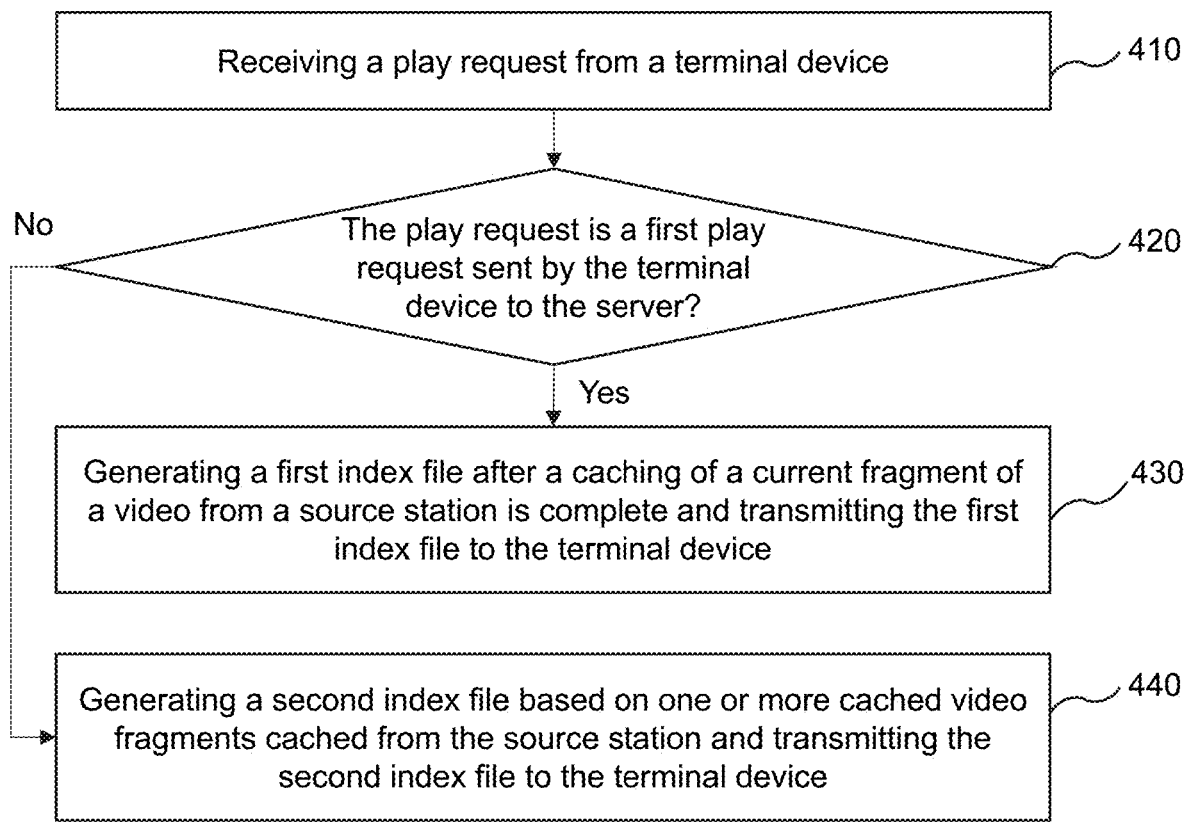
FIG. 4 is a flowchart illustrating an exemplary process for responding to a play request according to some embodiments of the present disclosure.

FIG. 4 is a flowchart illustrating an exemplary process for responding to a play request according to some embodiments of the present disclosure. In some embodiments, the process 400 may be implemented as a set of instructions (e.g., an application) stored in the storage ROM 230 or RAM 240. The processor 220 and/or the modules in FIG. 7 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, a server (e.g., the server 110) may receive a play request from a terminal device (e.g., the user device 140). In some embodiments, the play request may be received by the processing device 112 (e.g., a receiving module 710 illustrated in FIG. 7) (e.g., the interface circuits of the processor 220).

In some embodiments, the server may be an HTTP Live Streaming (HLS) server providing stream media services (e.g., live stream services (or substantially live stream services)) via an HLS which may be a network transmission protocol for stream media based on a Hyper Text Transfer Protocol (HTTP). As used herein, the live stream may refer to stream media simultaneously recorded and broadcast in real time. Accordingly, the play request may be an M3U8 request for a live stream and the terminal device may be an electronic device (e.g., a smartphone, a tablet computer, a desktop computer, a laptop computer) with a play function. As used herein, the M3U8 request may refer to a request for a live stream in an M3U8 format.

In 420, the server may determine whether the play request is a first play request sent by the terminal device to the server. Take a specific live stream as an example, the server may determine whether the play request is a request that the terminal device requests the specific live stream for the first time. In some embodiments, whether the play request is the first play request sent by the terminal device may be determined by the processing device 112 (e.g., a second determination module 730 illustrated in FIG. 7) (e.g., the processing circuits of the processor 220).

In some embodiments, when receiving a play request from the terminal device (e.g., when receiving a play request sent by the terminal device for the first time), the server may assign a Unique Identifier (UID) to the terminal device. Accordingly, the server may determine whether the play request is the first play request sent by the terminal device to the server based on the UID. As used herein, the UID may refer to a character string (e.g., a 128-bit character string) used to uniquely identify the terminal device. In some embodiments, the UID may include a Universally Unique Identifier (UUID).

In some embodiments, the server may assign the UID to the terminal device via a redirect. In some embodiments, the redirect may include a Uniform Resource Locator (URL) redirection (e.g., a 302 redirect). Specifically, when receiving a play request from the terminal device, the server may transmit the UID and a redirect address to the terminal device which allows the terminal device to continue to send a paly request to the server via the redirect address.

In some embodiments, for a specific terminal device, the server may record an order and/or a count of play requests received from the terminal device, associatively save the order and/or the count of the play requests received from the terminal device and the UID of the terminal device, and establish a correspondence table between the UID of the terminal device and the order and/or the count of the play requests. Accordingly, when receiving a play request from the terminal device, according to the UID of the terminal device, the server may identify a count corresponding to the UID in the correspondence table. Further, the server may determine whether the play request is the first play request sent by the terminal device to the server based on the count corresponding to the UID of the terminal device. For example, when the count corresponding to the UID of the terminal device is equal to 0, the server may determine that the play request is the first play request sent by the terminal device to the server. As another example, when the count corresponding to the UID of the terminal device is larger than 0, the server may determine that the play request is not the first play request sent by the terminal device to the server.

In some embodiments, the server may also determine whether the play request is a request sent by a first terminal (also referred to as a "first terminal device") to request the live stream. Also take a specific live stream as an example, the server may determine whether the terminal device is a first terminal device to request the specific live stream. In response to determining that the play request is the request sent by the first terminal to request the live stream, the server may obtain real time data stream (also referred to as "real time media stream") of the live stream from a source station. Further, the server may fragment the real time data stream of the live stream into a predetermined number (e.g., N) of fragments (also referred to as "Transport Stream (TS) fragments") and cache the predetermined number of fragments into a cache. Accordingly, in some embodiments, in order to determine whether the play request is the request sent by the first terminal to request the live stream, the server may determine whether there are one or more cached fragments associated with the live stream. In response to determining that there is no cached fragment associated with the live stream, the server may determine that the play request is the request sent by the first terminal to request the live stream; in response to determining that there are one or more cached fragments associated with the live stream, the server may determine that the play request is not the request sent by the first terminal to request the live stream (referred to as "a request sent by a non-first terminal (also referred to as a "non-first terminal device") to request the live stream").

Further, as described in connection with above, in 430, in response to determining that the play request is the first play request sent by the terminal device to the server, the server may generate a first index file at a time point when a caching of one or more current fragments from the source station is completed and transmit the first index file to the terminal device. In some embodiments, the first index file may be generated by the processing device 112 (e.g., a generation module (not shown)) (e.g., the processing circuits of the processor 220) and transmitted by the processing device 112 (e.g., a transmission module 740 illustrated in FIG. 7) (e.g., the interface circuits of the processor 220). In some embodiments, it is assumed that the play request is a request sent by a first terminal to request the live stream, the first index file may correspond to the predetermined number of fragments. In some embodiments, it is assumed that the play request is a request sent by a non-first terminal to request the live stream and the play request is a first request sent by the non-first terminal to the server to request the live stream, the first index file may be an index file corresponding to a current fragment which is just cached and at least one of one or more previously cached fragments.

In some embodiments, the server may transmit the first index file to the terminal device to allow the terminal device to request corresponding video fragments from the server based on a sequence (e.g., a playing sequence) indicated by the first index file. After receiving the first index file, the terminal device may request the corresponding video fragments from the server based on the sequence indicated by the first index file and play the corresponding video fragments sequentially.

In 440, in response to determining that the play request is not the first play request sent by the terminal device to the server, the server may generate a second index file based on one or more cached fragments and transmit the second index file to the terminal device. In some embodiments, the second index file may be generated by the processing device 112 (e.g., the generation module (not shown)) (e.g., the processing circuits of the processor 220) and transmitted by the processing device 112 (e.g., the transmission module 740 illustrated in FIG. 7) (e.g., the interface circuits of the processor 220). In some embodiments, as described above, whether the terminal device is the first terminal or the non-first terminal, when the play request is not a first request sent by the terminal device to the server to request the live stream, the second index file may be an index file corresponding to at least one of one or more previously cached fragments. For example, the terminal device may send a next request for the live stream to the server during a time period when the terminal device requests (or plays) fragments corresponding to a current request. After receiving the next request, the server may generate and transmit the second index file corresponding to the next request to the terminal device at a time point when the playing of the fragments corresponding to the current request is completed.

In some embodiments, the server may transmit the second index file to the terminal device to allow the terminal device to request corresponding video fragments from the server based on a sequence (e.g., the playing sequence) indicated by the second index file. After receiving the second index file, the terminal device may request the corresponding video fragments from the server based on the sequence indicated by the second index file and play the corresponding video fragments sequentially.

In some embodiments, the index file may include playing information indicating a playing sequence of fragments corresponding to the index file and/or a length of each of the fragments. In some embodiments, as described in connection with operation 410, the index file may be an M3U8 index file in response to the M3U8 request. The M3U8 index file may refer to a Moving Picture Experts Group Audio Layer 3 Uniform Resource Locator (M3U) file in an 8-bit Unicode Transformation Format (UTF-8), wherein the M3U file may be a plain text file that records an index of the fragments. In some embodiments, after receiving an instruction for opening the M3U8 index file, the terminal device may find network addresses of the fragments corresponding to the M3U8 index file and play the fragments sequentially according to the M3U8 index file.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5:
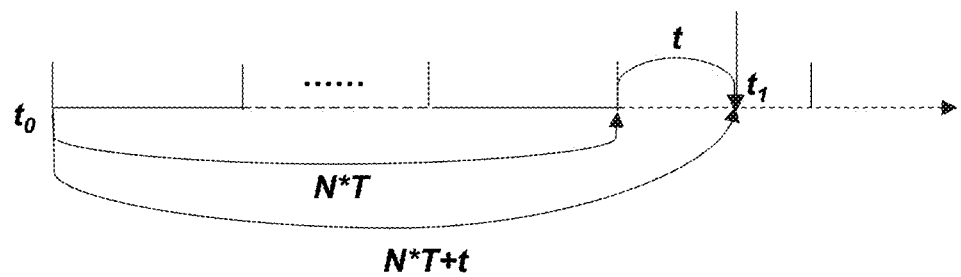
FIG. 5 is a schematic diagram illustrating an exemplary live delay associated with a live stream according to the prior art.

FIG. 5 is a schematic diagram illustrating an exemplary live delay associated with a live stream according to the prior art. It is assumed that the server is an HLS server which can access a stream source (e.g., a source station) via a first protocol (e.g., a real time streaming protocol (e.g., an RTSP, an RTMP)) and transmit index files to a terminal device via a second protocol (e.g., the HLS). A traditional workflow may be that the terminal device sends a play request to the HLS server to request a live stream; the HLS server obtains the live stream from the stream source via RTSP or RTMP and fragments the live stream (i.e., real time data stream of the live stream) into a plurality of video fragments; the HLS further generates an M3U8 index file corresponding to the video fragments and transmits the M3U8 index file to the terminal device. After receiving the M3U8 index file, the terminal device may download each of the video fragments according to a playing sequence included in the M3U8 index file and play the video fragments sequentially. Since the HLS server generates and transmits an M3U8 index file only after a predetermined number of video fragments are cached, when the application scenario is a live streaming scenario (e.g., a live streaming scenario associated with the RTSP or RTMP), there may be a live time delay.

As illustrated, it is assumed that a predetermined number of cached video fragments is N and a duration of each of the N video fragments is T seconds. For the first terminal device (i.e., a first terminal to request a specific live stream), after receiving an M3U8 play request sent by the terminal device at a time point $t_0$, the HLS server may cache N video fragments, generate an M3U8 index file corresponding to the N video fragments, and transmit the M3U8 index file to the user. It can be seen that a live delay associated with the live stream for the first terminal device is N*T seconds. For the non-first terminal device (i.e., a non-first terminal to request the specific live stream), after receiving an M3U8 play request sent by the terminal device at a time point $t_1$ (i.e., a time point when a (N+1)th video fragment is being cached and has been cached for t seconds), the HLS server may generate an M3U8 index file corresponding to N cached video fragments and transmit the M3U8 index file to the terminal device. It can be seen that a live delay associated with the live stream for the non-first terminal device is N*T+t seconds ($0 \leq t<T$), which is larger than a live delay (i.e., N*T seconds) for the first terminal device.

Figure 6A:
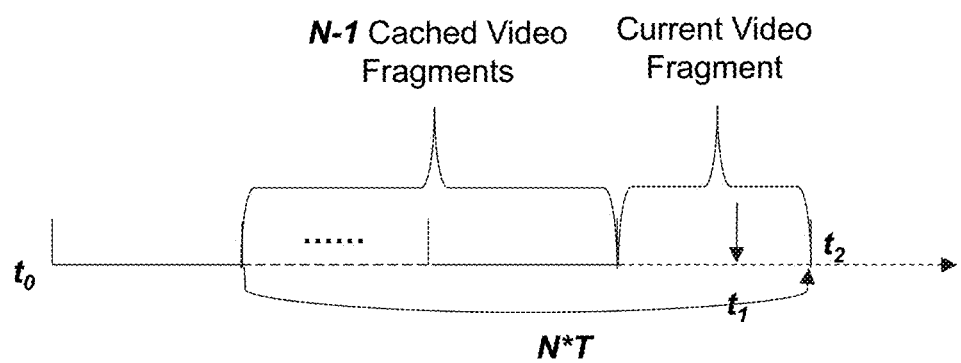
FIGS. 6A-6B are schematic diagrams illustrating exemplary live delays associated with a live stream for a non-first terminal device according to some embodiments of the present disclosure.
Figure 6B:
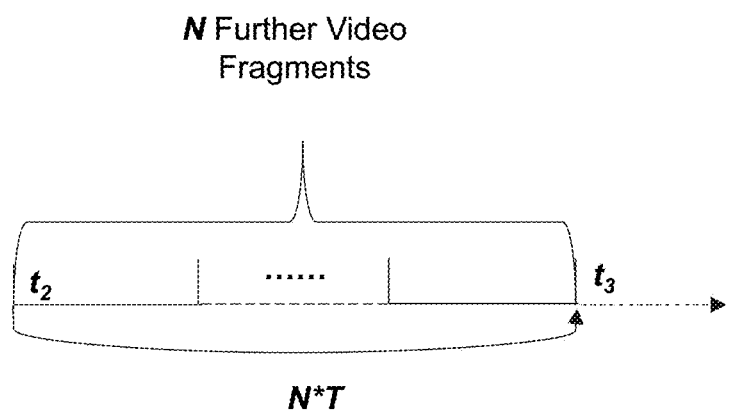

FIGS. 6A-6B are schematic diagrams illustrating exemplary live delays associated with a live stream for a non-first terminal device according to some embodiments of the present disclosure. As illustrated in FIG. 6A, the HLS server receives an M3U8 play request for a live stream sent by a non-first terminal device at a time point $t_1$. When determining that the M3U8 play request is the first play request sent by the non-first terminal device to the HLS server, the HLS server may generate an M3U8 index file (e.g., a first index file) after a caching of a current video fragment is completed (e.g., at a time point $t_2$) and transmit the M3U8 index file to the non-first terminal device. As illustrated, the M3U8 index file corresponds to the current video fragment and N−1 cached video fragments. It can be seen that a live delay associated with the live stream for the non-first terminal device is N*T seconds.

After receiving the M3U8 index file, the non-first terminal device may request fragments including the N−1 cached video fragments and the current video fragment from the HLS server sequentially based on a sequence (e.g., the playing sequence) indicated by the M3U8 index file and play the fragments sequentially. During a time period when the non-first terminal device requests (or plays) the fragments, the HLS server may continue to cache video fragments from the stream source. As illustrated in FIG. 6B, at a time point when the playing of the fragments is completed (e.g., at a time point $t_3$), the HLS server can complete a caching of N further video fragments. During a time period from $t_2$ to $t_3$, the non-first terminal device can send a next M3U8 request for the live stream. In this situation, the HLS server may determine that the next M3U8 play request is not the first play request sent by the non-first terminal device to the HLS server, therefore, the HLS server may generate an M3U8 index file (e.g., a second index file) corresponding to the N further video fragments at the time point $t_3$ and transmit the M3U8 index file to the non-first terminal device. It can be seen that a live delay associated with the live stream for the non-first terminal device is still N*T seconds.

According to the embodiments of the present disclosure, the live delay (e.g., N*T seconds) for the non-first terminal device is the same as the live delay (e.g., N*T seconds) for the first terminal device, thereby improving user experience for the non-first terminal.

In some embodiments, as described in connection with FIG. 4, after receiving the M3U8 play request from the terminal device, the HLS server may directly perform operations 420 and 430/440 without determining whether the terminal device is a first terminal or not, which can save hardware resources, simplify the process for live streaming, and reduce the live delay for the non-first terminal.

In some embodiments, after receiving the M3U8 play request from the terminal device, the HLS server may determine whether the terminal device is a first terminal or not. In response to determining that the terminal device is the first terminal, as described in connection with FIG. 5, the HLS server may access the stream source to cache the predetermined number of video fragments associated with the live stream, generate the index file based on the predetermined number of video fragments, and transmit the index file to the terminal device. In response to determining that the terminal device is the non-first terminal, as described in connection with FIG. 4, the HLS server may perform operations 420 and 430/440. According to the embodiments of the present disclosure, for the non-first terminal, the live delay can be reduced and user experience can be improved.

Figure 7:
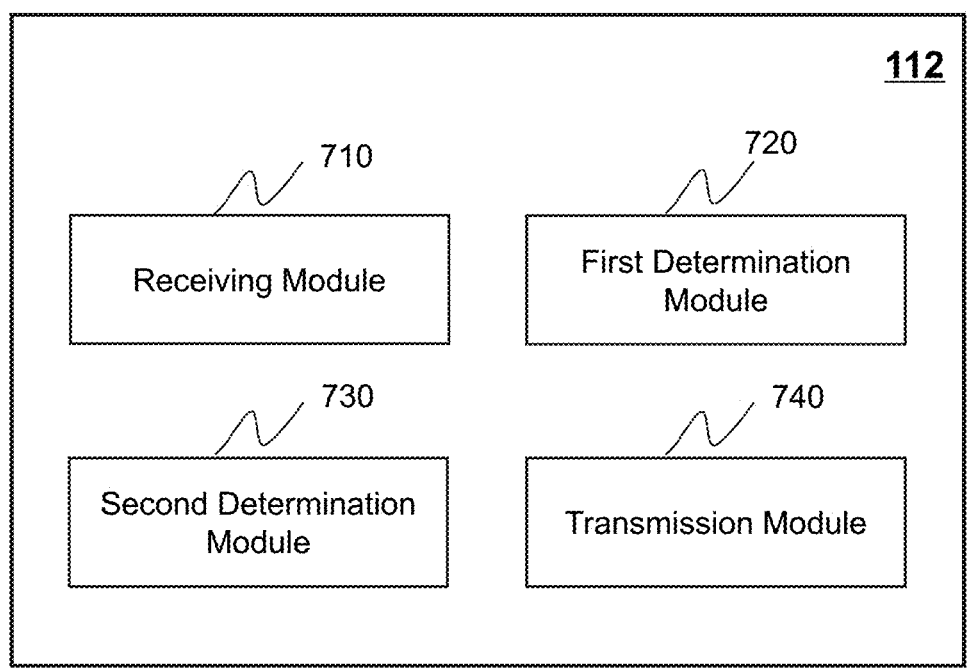
FIG. 7 is a block diagram illustrating an exemplary processing device according to some embodiments of the present disclosure.

FIG. 7 is a block diagram illustrating an exemplary processing device according to some embodiments of the present disclosure. The processing device 112 may include a receiving module 710, a first determination module 720, a second determination module 730, and a transmission module 740.

The receiving module 710 may be configured to receive a play request associated with a live stream from a terminal device (e.g., the user device 130).

The first determination module 720 may be configured to determine whether there are one or more cached fragments associated with the live stream.

In response to determining that there are one or more cached fragments associated with the live stream, the second determination module 730 may be configured to determine whether the play request is a request that the terminal device requests the live stream for the first time.

In response to determining that the play request is the request that the terminal device requests the live stream for the first time, after a caching of a current fragment is completed, the transmission module 740 may be configured to transmit an index file corresponding to the current fragment and at least one of the one or more cached fragments to the terminal device via a second protocol (e.g., an HLS). In some embodiments, after receiving the index file corresponding to the current fragment and the at least one of the one or more cached fragments, the terminal device may send a fragment request associated with the current fragment and the at least one of the one or more cached fragments to the transmission module 740. After receiving the fragment request, the transmission module 740 may transmit the at least one of the one or more cached fragments and the current fragment to the terminal device sequentially according to the index file (e.g., the playing sequence indicated by the index file). The terminal device may receive and play the at least one of the one or more cached fragments and the current fragment sequentially.

In response to determining that the play request is not the request that the terminal device requests the live stream for the first time, the transmission module 740 may be configured to transmit an index file corresponding to at least one of the one or more cached fragments to the terminal device via the second protocol (e.g., an HLS). In some embodiments, after receiving the index file corresponding to the at least one of the one or more cached fragments, the terminal device may send a fragment request associated with the at least one of the one or more cached fragments to the transmission module 740. After receiving the fragment request, the transmission module 740 may transmit the at least one of the one or more cached fragments to the terminal device sequentially according to the index file (e.g., the playing sequence indicated by the index file). The terminal device may receive and play the at least one of the one or more cached fragments sequentially.

In response to determining that there is no cached fragment associated with the live stream, the second determination module 730 may be configured to access the stream source via the first protocol to cache a predetermined number (e.g., N) of fragments associated with the live stream. Further, the transmission module 740 may transmit an index file corresponding to the predetermined number of fragments to the terminal device via the second protocol (e.g., an HLS). After receiving the index file corresponding to the predetermined number of fragments, the terminal device may send a fragment request associated with the predetermined number of fragments to the transmission module 740. After receiving the fragment request associated with the predetermined number of fragments, the transmission module 740 may transmit the predetermined number of fragments to the terminal device sequentially according to the index file (e.g., the playing sequence indicated by the index file). The terminal device may receive and play the predetermined number of fragments sequentially.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the first determination module 720 and the second determination module 730 may be combined as a single module which may both determine whether there are one or more cached fragments associated with the live stream and whether the play request is the request that the terminal device requests the live stream for the first time. As another example, the processing device 112 may include a storage module (not shown) used to store information and/or data (e.g., the play request, the one or more cached fragments) associated with the live stream. As a further example, the processing device 112 may include a generation module (not shown) configured to generate an index file.

Figure 8:
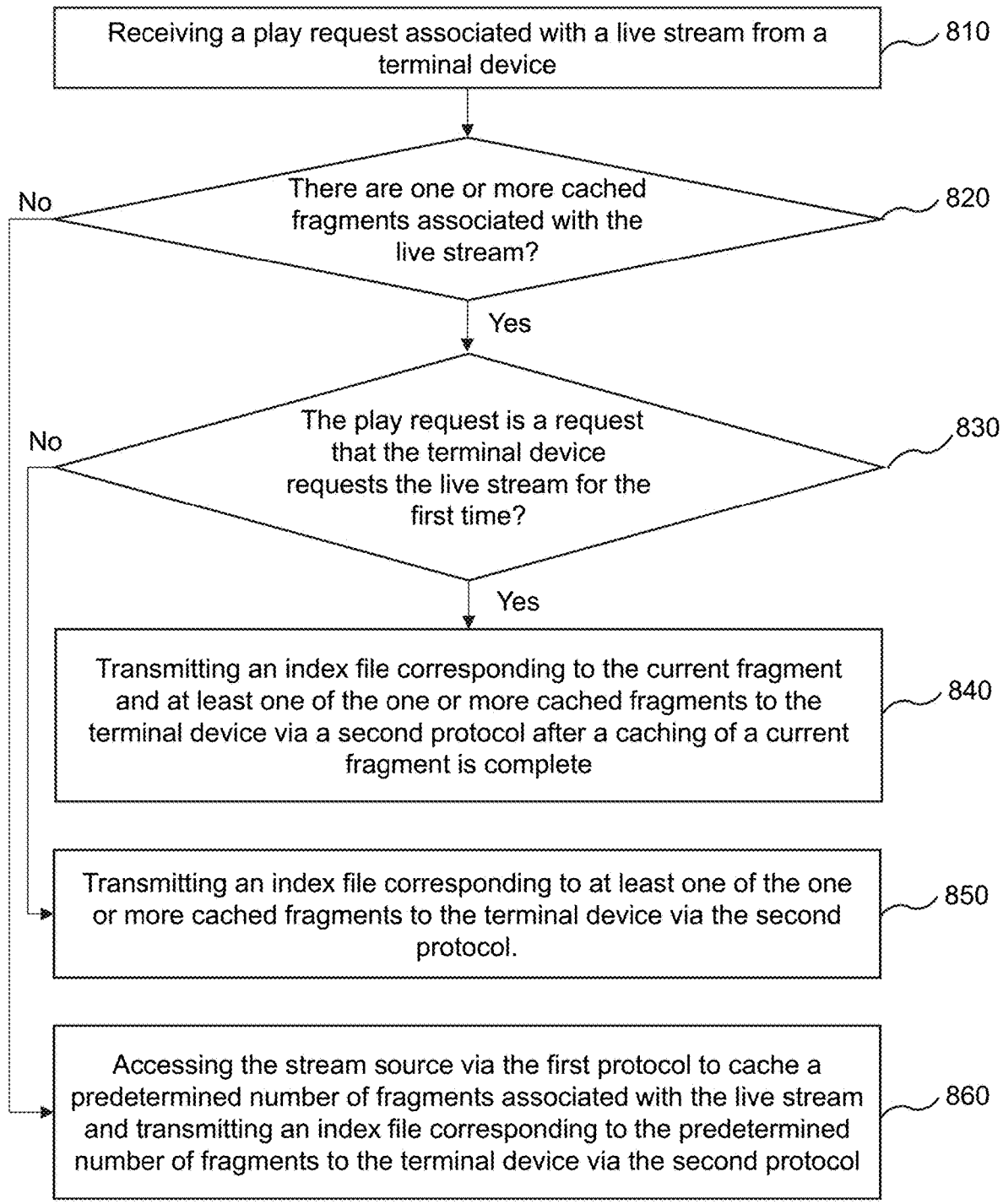
FIG. 8 is a flowchart illustrating an exemplary process for live streaming according to some embodiments of the present disclosure.

FIG. 8 is a flowchart illustrating an exemplary process for live streaming according to some embodiments of the present disclosure. In some embodiments, the process 800 may be implemented as a set of instructions (e.g., an application) stored in the storage ROM 230 or RAM 240. The processor 220 and/or the modules in FIG. 7 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting.

In 810, the processing device 112 (e.g., the receiving module 710) (e.g., the interface circuits of the processor 220) may receive a play request associated with a live stream from a terminal device (e.g., the user device 130).

As described in connection with FIG. 4, the play request may be an M3U8 request and the live stream may refer to stream media simultaneously recorded and broadcast in real time. In some embodiments, a user may send the play request associated with the live stream via the terminal device. For example, the user may send the play request associated with the live stream via a live streaming App (e.g., a live streaming platform) installed on the terminal device.

In 820, the processing device 112 (e.g., the first determination module 720) (e.g., the processing circuits of the processor 220) may determine whether there are one or more cached fragments associated with the live stream.

In some embodiments, the one or more cached fragments may be cached from a stream source via a first protocol (e.g., an RTSP, an RTMP). As described in connection with FIG. 4, the processing device 112 may access the stream source via the first protocol and obtain real time data stream associated with the live stream from the stream source. Further, the processing device 112 may fragment the real time data stream associated with the live stream into a plurality of fragments and cache the plurality of fragments into a cache (which may be integrated into the processing device 112 or the storage device 140). In some embodiments, the cache may include a hardware cache (e.g., a central processing unit (CPU) cache, a graphics processing unit (GPU) cache), a software cache (e.g., a disk cache, a web cache), a database cache, a distributed cache, etc.

As described in connection with FIG. 4, the processing device 112 may determine whether the terminal device is a first terminal device to request the live stream by determining whether there are one or more cached fragments associated with the live stream. In some embodiments, in response to determining that there are one or more cached fragments associated with the live stream, that is, the terminal device is a non-first terminal device to request the live stream, the processing device 112 may execute the process 800 to operation 830. In some embodiments, in response to determining that there is no cached fragment associated with the live stream, that is, the terminal device is the first terminal device to request the live stream, the processing device 112 may execute the process 800 to operation 860.

In 830, the processing device 112 (e.g., the second determination module 730) (e.g., the processing circuits of the processor 220) may determine whether the play request is a request that the terminal device requests the live stream for the first time.

In some embodiments, the processing device 112 may determine whether the play request is the request that the terminal device requests the live stream for the first time based on an identifier (e.g., the UUID) corresponding to the terminal device. As used herein, the identifier may be used to uniquely identify the terminal device. Specifically, after receiving the play request from the terminal device, the processing device 112 may determine whether an identifier has been assigned to the terminal device. In response to determining that no identifier has been assigned to the terminal device, the processing device 112 may determine that the play request is the request that the terminal device requests the live stream for the first time. Further, the processing device 112 may assign a corresponding identifier to the terminal device and associatively save the play request associated with the live stream received from the terminal device and the identifier corresponding to the terminal device into a storage device (e.g., the storage device 140). In response to determining that an identifier has been assigned to the terminal device, the processing device 112 may determine whether there are one or more records of play requests associated with the live stream in the storage device 140 based on the identifier corresponding to the terminal device. In response to determining that there is no record of play requests associated with the live stream in the storage device 140, the processing device 112 may determine that the play request is the request that the terminal device requests the live stream for the first time. In response to determining that there are one or more records of play requests associated with the live stream in the storage device 140, the processing device 112 may determine that the play request is not the request that the terminal device requests the live stream for the first time.

In some embodiments, as described in connection with FIG. 4, the processing device 112 may assign the identifier to the terminal device via a redirect (e.g., a 302 redirect) which includes a redirect address (e.g., a URL). Further, the processing device 112 may transmit the redirect address to the terminal device to allow the terminal device to continue to send the play request based on the redirect address.

In some embodiments, in response to determining that the play request is the request that the terminal device requests the live stream for the first time, the processing device 112 may execute the process 800 to operation 840. In some embodiments, in response to determining that the play request is not the request that the terminal device requests the live stream for the first time, the processing device 112 may execute the process 800 to operation 850.

In 840, after a caching of a current fragment is completed, the processing device 112 (e.g., the transmission module 740) (e.g., the interface circuits of the processor 220) may transmit an index file corresponding to the current fragment and at least one of the one or more cached fragments to the terminal device via a second protocol (e.g., an HLS).

As described in connection with FIG. 6A, after the caching of the current fragment is completed (e.g., at a time point $t_2$ illustrated in FIG. 6A), the processing device 112 (e.g., the generation module) (e.g., the processing circuits of the processor 220) may generate the index file corresponding to the current fragment (e.g., a current video fragment illustrated in FIG. 6A) and the at least one of the one or more cached fragments (e.g., N−1 cached video fragments illustrated in FIG. 6A). In some embodiments, after receiving the index file corresponding to the current fragment and the at least one of the one or more cached fragments, the terminal device may send a fragment request associated with the current fragment and the at least one of the one or more cached fragments to the processing device 112. After receiving the fragment request, the processing device 112 (e.g., the transmission module 740) (e.g., the interface circuits of the processor 220) may transmit the at least one of the one or more cached fragments and the current fragment to the terminal device sequentially according to the index file (e.g., the playing sequence indicated by the index file). The terminal device may receive and play the at least one of the one or more cached fragments and the current fragment sequentially.

In 850, the processing device 112 (e.g., the transmission module 740) (e.g., the interface circuits of the processor 220) may transmit an index file corresponding to at least one of the one or more cached fragments to the terminal device via the second protocol (e.g., an HLS). As described in connection with FIG. 6B, in response to determining that the play request is not the request that the terminal device requests the live stream for the first time, the processing device 112 (e.g., the generation module) (e.g., the processing circuits of the processor 220) may generate the index file corresponding to at least one of the one or more cached fragments (e.g., N further video fragments illustrated in FIG. 6B). In some embodiments, after receiving the index file corresponding to the at least one of the one or more cached fragments, the terminal device may send a fragment request associated with the at least one of the one or more cached fragments to the processing device 112. After receiving the fragment request, the processing device 112 (e.g., the transmission module 740) (e.g., the interface circuits of the processor 220) may transmit the at least one of the one or more cached fragments to the terminal device sequentially according to the index file (e.g., the playing sequence indicated by the index file). The terminal device may receive and play the at least one of the one or more cached fragments sequentially.

In 860, the processing device 112 (e.g., the second determination module 730) (e.g., the processing circuits of the processor 220) may access the stream source via the first protocol to cache a predetermined number (e.g., N) of fragments associated with the live stream. The processing device 112 (e.g., the generation module) (e.g., the processing circuits of the processor 220) may generate an index file corresponding to the predetermined number of fragments. Further, the processing device 112 (e.g., the transmission module 740) (e.g., the interface circuits of the processor 220) may transmit the index file to the terminal device via the second protocol (e.g., an HLS). Similarly, after receiving the index file corresponding to the predetermined number of fragments, the terminal device may send a fragment request associated with the predetermined number of fragments to the processing device 112. After receiving the fragment request associated with the predetermined number of fragments, the processing device 112 may transmit the predetermined number of fragments to the terminal device sequentially according to the index file (e.g., the playing sequence indicated by the index file). The terminal device may receive and play the predetermined number of fragments sequentially.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 800. In the storing operation, the processing device 112 may store information and/or data (e.g., the play request, the one or more cached fragments) associated with the live stream in a storage device (e.g., the storage device 140) disclosed elsewhere in the present disclosure. As another example, operation 820 and operation 830 may be combined into a single operation in which the processing device 112 may both determine whether there are one or more cached fragments associated with the live stream and whether the play request is the request that the terminal device requests the live stream for the first time.

Figure 9:
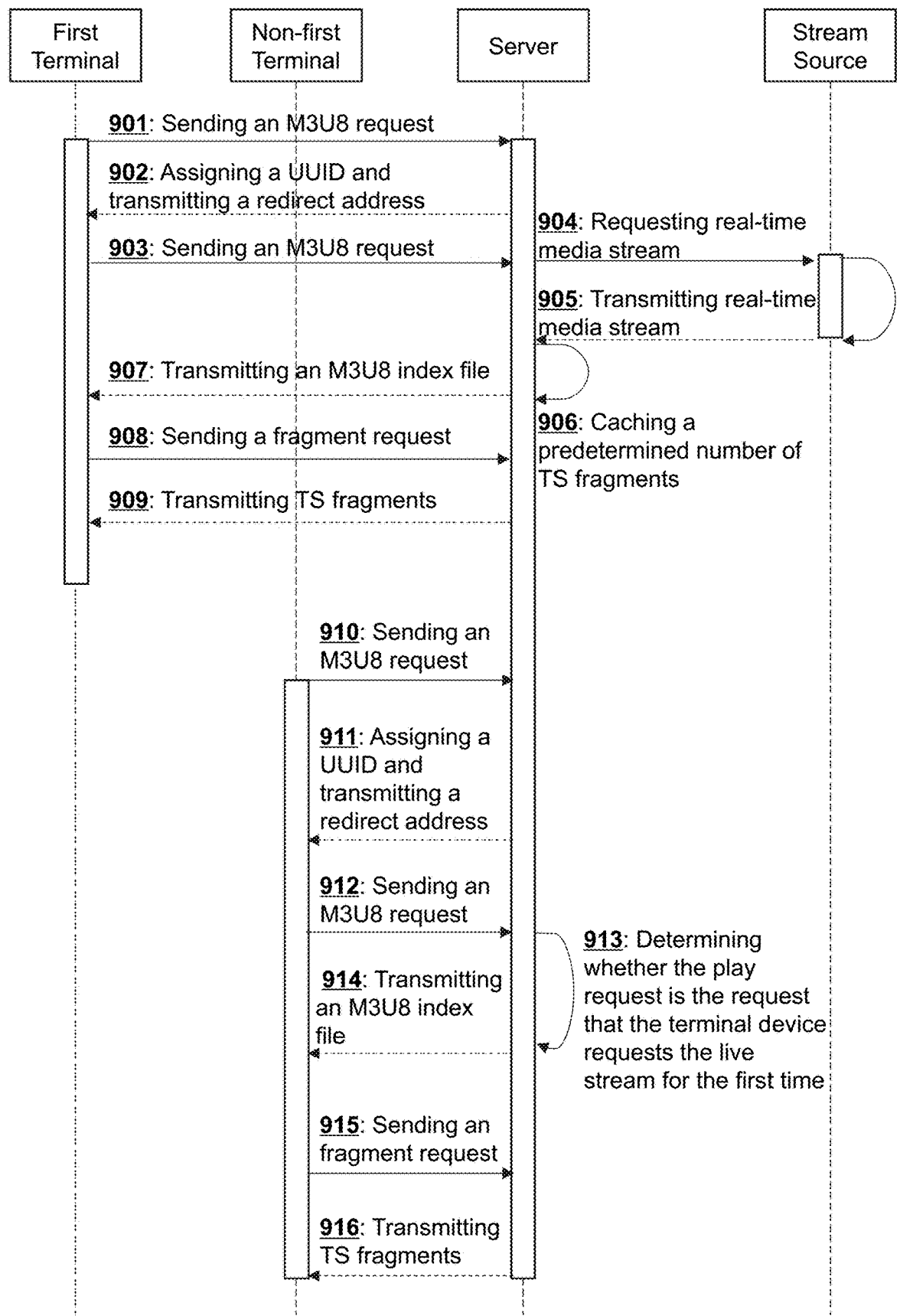
FIG. 9 is a schematic diagram illustrating an exemplary process for live streaming according to some embodiments of the present disclosure.

FIG. 9 is a schematic diagram illustrating an exemplary process for live streaming according to some embodiments of the present disclosure.

As described elsewhere in the present disclosure, after receiving an M3U8 request associated with a live stream from a terminal device, a server (e.g., the server 110) may determine whether there are one or more cached fragments (e.g., TS fragments) associated with the live stream. In response to determining that there is no cached fragment associated with the live stream, the server may determine that the terminal device is a first terminal requesting the live stream and execute operations 901-909. In response to determining that there are one or more cached fragments associated with the live stream, the server may determine that the terminal device is a non-first terminal requesting the live stream and execute operations 910-916.

In 901, the server may receive an M3U8 request associated with a live stream from the first terminal. After receiving the M3U8 request, the server may determine whether an identifier (e.g., a UUID) has been assigned to the first terminal. In response to determining that an identifier has been assigned to the first terminal, the server may directly execute operation 904. In response to determining that no identifier has been assigned to the first terminal, the server may execute operation 902 and operation 903.

In 902, the server may assign an identifier to the first terminal to uniquely identify the first terminal and transmit a redirect address to the first terminal via a redirect (e.g., a 302 redirect).

In 903, after receiving the redirect address, the first terminal may continue to send an M3U8 request associated with the live stream to the server based on the redirect address.

In 904, after receiving the M3U8 request, the server may transmit a request for obtaining real-time data steam associated with the live stream to a stream source.

In 905, after receiving the request, the stream source may transmit the real-time media stream associated with the live stream to the server.

In 906, according to the real time media stream, the server may cache a predetermined number (e.g., N) of TS fragments associated with the live stream and generate an M3U8 index file corresponding to the predetermined number of TS fragments.

In 907, the server may further transmit the M3U8 index file corresponding to the predetermined number of TS fragments to the first terminal.

In 908, after receiving the M3U8 index file corresponding to the predetermined number of TS fragments, the first terminal may send a fragment request associated with the predetermined number of TS fragments to the server.

In 909, after receiving the fragment request, the server may transmit the predetermined number of TS fragments to the first terminal sequentially according to the M3U8 index file (e.g., the playing sequence indicated by the M3U8 index file). Further, the first terminal may receive and play the predetermined number of TS fragments sequentially.

In 910, the server may receive an M3U8 request associated with a live stream from a non-first terminal. After receiving the M3U8 request, the server may determine whether an identifier (e.g., a UUID) has been assigned to the non-first terminal. In response to determining that an identifier has been assigned to the non-first terminal, the server may directly execute operation 913. In response to determining that no identifier has been assigned to the non-first terminal, the server may execute operation 911 and operation 912.

In 911, the server may assign an identifier to the non-first terminal to uniquely identify the non-first terminal and transmit a redirect address to the non-first terminal via a redirect (e.g., a 302 redirect).

In 912, after receiving the redirect address, the non-first terminal may continue to send an M3U8 request associated with the live stream to the server based on the redirect address.

In 913, after receiving the M3U8 request, the server may determine whether the M3U8 request is a request that the non-first terminal requests the live stream for the first time based on the identifier corresponding to the non-first terminal. In response to determining that the M3U8 request is the request that the non-first terminal requests the live stream for the first time, the server may wait for a caching of a current TS fragment is completed and generate an M3U8 index file corresponding to the current TS fragment and at least one (e.g., N−1) of the one or more cached TS fragments. In response to determining that the M3U8 request is not the request that the non-first terminal requests the live stream for the first time, the server may generate an M3U8 index file corresponding to at least one (e.g., N) of the one or more cached TS fragments.

In 914, the server may further transmit the M3U8 index file to the non-first terminal.

In 915, after receiving the M3U8 index file, the non-first terminal may send a fragment request associated with TS fragments (e.g., the current TS fragment and the at least one (e.g., N−1) of the one or more cached TS fragments, the at least one (e.g., N) of the one or more cached TS fragments) to the server.

In 916, after receiving the fragment request, the server may transmit the TS fragments to the non-first terminal sequentially according to the M3U8 index file (e.g., the playing sequence indicated by the M3U8 index file). Further, the non-first terminal may receive and play the TS fragments sequentially.

In some embodiments, the present disclosure may also provide a server including a processor and a storage electrically coupled to the processor, wherein the storage stores a computer program. When executed by a processor, the computer program may direct the processor to perform a process (e.g., process 400, process 800) described elsewhere in the present disclosure. In some embodiments, the server may be an HLS server.

In some embodiments, the present disclosure may also provide a computer readable storage medium storing a computer program thereon. When the computer program is executed, a process (e.g., process 400, process 800) described elsewhere in the present disclosure may be implemented. As used herein, the storage medium may include a U disk, a mobile hard disk, a read-only memory (ROM), a random access memory (RAM), a disk, an optical disk, or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:
1. A system, comprising:
   at least one storage medium including a set of instructions; and at least one processor in communication with the at least one storage medium, wherein when executing the set of instructions, the at least one processor is directed to cause the system to:
receive, from a terminal device, a play request associated with a live stream;
determine whether there are one or more cached fragments associated with the live stream, wherein the one or more cached fragments are cached from a stream source via a first protocol;
in response to determining that there are one or more cached fragments associated with the live stream, determine whether the play request is a request that the terminal device requests the live stream for the first time;
in response to determining that the play request is the request that the terminal device requests the live stream for the first time, after a caching of a current fragment is completed, transmit, via a second protocol, an index file corresponding to the current fragment and at least one of the one or more cached fragments to the terminal device;
in response to determining that the play request is not the request that the terminal device requests the live stream for the first time, transmit an index file corresponding to at least one of the one or more cached fragments to the terminal device via the second protocol; and
in response to determining that there is no cached fragment associated with the live stream, access the stream source via the first protocol to cache a predetermined number of fragments associated with the live stream; and transmit an index file corresponding to the predetermined number of fragments to the terminal device via the second protocol.

2. The system of claim 1, wherein to determine whether the play request is the request that the terminal device requests the live stream for the first time, the at least one processor is directed to cause the system further to: determine whether the play request is the request that the terminal device requests the live stream for the first time based on an identifier corresponding to the terminal device.

3. The system of claim 2, wherein the identifier corresponding to the terminal device includes a Universally Unique Identifier (UUID).

4. The system of claim 2, wherein the identifier corresponding to the terminal device is assigned to the terminal device via a redirect.

5. The system of claim 1, wherein the first protocol includes a Real Time Streaming Protocol (RTSP) or a Real Time Messaging Protocol (RTMP) and the second protocol includes an HTTP Live Streaming (HLS).

6. The system of claim 1, wherein the at least one processor is directed to cause the system to: receive a fragment request associated with the current fragment and the at least one of the one or more cached fragments from the terminal device; and transmit the current fragment and the at least one of the one or more cached fragments to the terminal device sequentially according to the index file.

7. The system of claim 1, wherein the play request is an M3U8 request and the index file is an M3U8 index file.

8. A method implemented on a computing device including at least one processor, at least one storage medium, and a communication platform connected to a network, the method comprising:
receiving, from a terminal device, a play request associated with a live stream;
determining whether there are one or more cached fragments associated with the live stream, wherein the one or more cached fragments are cached from a stream source via a first protocol;
in response to determining that there are one or more cached fragments associated with the live stream, determining whether the play request is a request that the terminal device requests the live stream for the first time;
in response to determining that the play request is the request that the terminal device requests the live stream for the first time, after a caching of a current fragment is completed, transmitting, via a second protocol, an index file corresponding to the current fragment and at least one of the one or more cached fragments to the terminal device;
in response to determining that the play request is not the request that the terminal device requests the live stream for the first time, transmitting an index file corresponding to at least one of the one or more cached fragments to the terminal device via the second protocol; and
in response to determining that there is no cached fragment associated with the live stream, accessing the stream source via the first protocol to cache a predetermined number of fragments associated with the live stream; and transmitting an index file corresponding to the predetermined number of fragments to the terminal device via the second protocol.

9. The method of claim 8, wherein the determining whether the play request is the request that the terminal device requests the live stream for the first time includes: determining whether the play request is the request that the terminal device requests the live stream for the first time based on an identifier corresponding to the terminal device.

10. The method of claim 9, wherein the identifier corresponding to the terminal device includes a Universally Unique Identifier (UUID).

11. The method of claim 9, wherein the identifier corresponding to the terminal device is assigned to the terminal device via a redirect.

12. The method of claim 8, wherein the first protocol includes a Real Time Streaming Protocol (RTSP) or a Real Time Messaging Protocol (RTMP) and the second protocol includes an HTTP Live Streaming (HLS).

13. The method of claim 8, wherein the method further includes: receiving a fragment request associated with the current fragment and the at least one of the one or more cached fragments from the terminal device; and transmitting the current fragment and the at least one of the one or more cached fragments to the terminal device sequentially according to the index file.

14. The method of claim 8, wherein the play request is an M3U8 request and the index file is an M3U8 index file.

15. A non-transitory computer readable medium, comprising executable instructions that, when executed by at least one processor, direct the at least one processor to perform a method, the method comprising:
receiving, from a terminal device, a play request associated with a live stream;
determining whether there are one or more cached fragments associated with the live stream, wherein the one or more cached fragments are cached from a stream source via a first protocol;
in response to determining that there are one or more cached fragments associated with the live stream, determining whether the play request is a request that the terminal device requests the live stream for the first time;

in response to determining that the play request is the request that the terminal device requests the live stream for the first time, after a caching of a current fragment is completed, transmitting, via a second protocol, an index file corresponding to the current fragment and at least one of the one or more cached fragments to the terminal device;

in response to determining that the play request is not the request that the terminal device requests the live stream for the first time, transmitting an index file corresponding to at least one of the one or more cached fragments to the terminal device via the second protocol; and in response to determining that there is no cached fragment associated with the live stream, accessing the stream source via the first protocol to cache a predetermined number of fragments associated with the live stream; and transmitting an index file corresponding to the predetermined number of fragments to the terminal device via the second protocol.

\* \* \* \* \*